United States Patent Office.

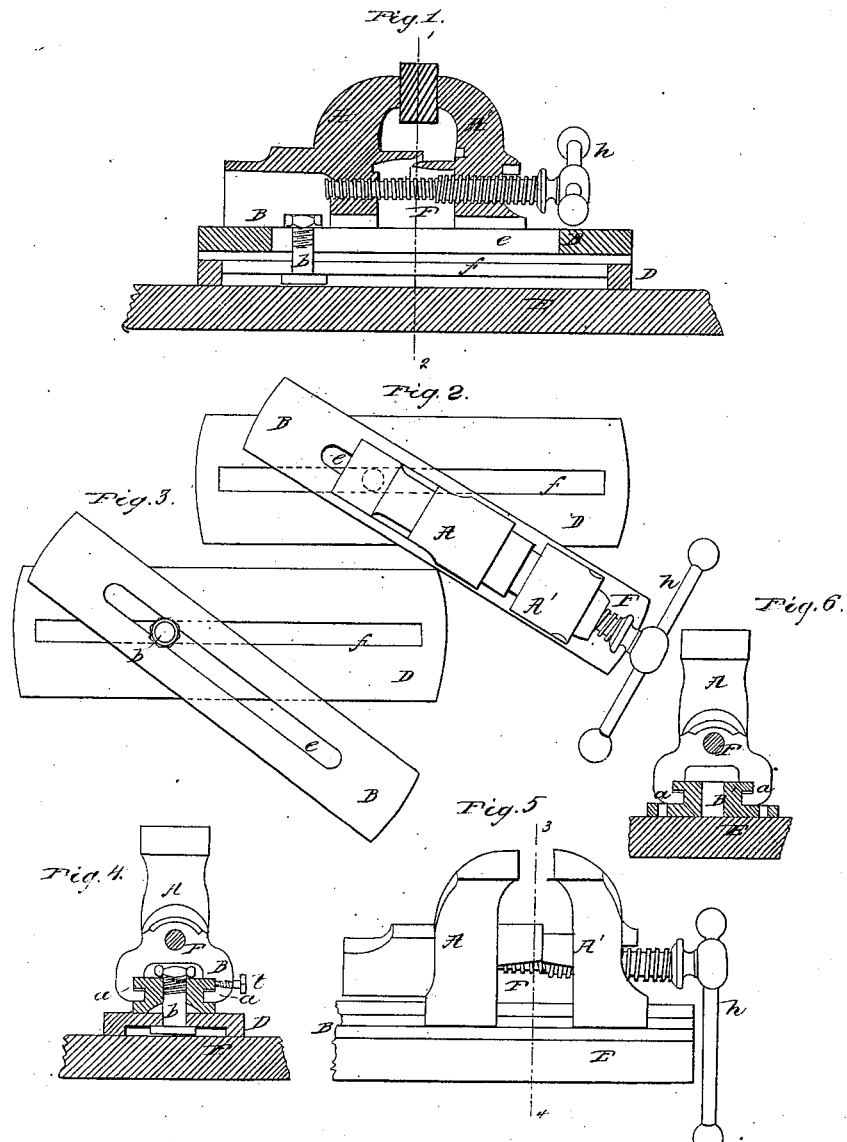

ABIEZER JAMESON, OF TRENTON, NEW JERSEY.

Letters Patent No. 77,289, dated April 28, 1868.

IMPROVEMENT IN VISES.

*The Schedule referred to in these Letters Patent and making part of the same.*

TO ALL WHOM IT MAY CONCERN:

Be it known that I, ABIEZER JAMESON, of Trenton, New Jersey, have invented certain Improvements in Vises; and I do hereby declare the following to be a full, clear, and exact description of the same.

My invention consists—

First, of certain jaws arranged to slide on a plate, and so adapted to the same that they will be firmly fastened to the said plate by and during the act of securing an object between the jaws, all substantially as described hereafter. The object of this part of my invention is to afford facilities for the ready adjustment of the vise from and towards the operator, and for securing the vise after adjustment.

Second, in the combination of the said sliding jaws with a movable plate and a permanent plate, all being constructed and arranged substantially as described hereafter, so that the said jaws will admit of both lateral and longitudinal adjustment.

In order to enable others skilled in the art to make and use my invention, I will now proceed to describe its construction and operation, reference being had to the accompanying drawing, in which—

Figure 1 is a longitudinal section of my improved vise,

Figure 2 a plan view,

Figure 3 a part of fig. 2,

Figure 4 a transverse section on the line 1–2, fig. 1,

Figure 5 an exterior view of the vise, showing a modification of the same, and

Figure 6 a vertical section on the line 3–4, fig. 5.

On reference to figs. 1, 2, 3, and 4, A and A', the two jaws of the vise, have, at their lower ends, ribs $a\ a$, adapted to grooves in the opposite edges of a plate, B, on which the jaws can slide to and fro freely.

A bolt, $b$, passes through an elongated slot, $e$, in the plate B, and through a similar slot, $f$, in an under plate, D, the latter being secured to the table or bench E in any suitable manner.

In connection with the two jaws, I use a screw, F, provided at the outer end with a suitable handle, $h$, one portion of the screw being larger in diameter than the other, the larger portion having a left-handed thread adapted to an internal thread in the jaw A', and the smaller portion of the screw a right-handed thread, adapted to a corresponding thread in the jaw A. By this arrangement the jaws can be moved simultaneously from and toward each other, the opening and closing being effected more rapidly than by the usual single screw.

As long as no object is grasped by and between the jaws of the vise, they can be moved to and fro freely on the plate B, and thus adjusted to any desired position. On securing any object between the jaws, however, by operating the screw, there is a tendency of the lower ends of the jaws to approach each other, and consequently the ribs $a$ become so tightly jammed in the grooves of the plate B that the jaws are as secure as though bolted to the table; this securing of the jaws being thus accomplished by and during the simple act of operating the screw for the purpose of causing the jaws to grasp any object.

Independently of this facility of adjusting the jaws longitudinally on the plate B, the latter, after loosening the nut of the bolt $b$, may be turned at any desired angle on the plate D, or moved longitudinally on the said plate, as circumstances may suggest, the two plates being secured together after adjustment by tightening the nut of the said bolt $b$. If desired, however, the under plate B may be dispensed with, and a single plate, B', on which the jaws are arranged to slide, may be secured directly to the bench, as seen in figs. 5 and 6. In this case the jaws admit of no adjustment, excepting a longitudinal one on the said plate B'.

One or other of the jaws may be provided with a set-screw, $t$, fig. 4, to be used for maintaining the jaws in a position to which they have been adjusted, providing it be desirable to retain them in one position, while the object to be operated on has to be removed and replaced.

I claim as my invention, and desire to secure by Letters Patent—

1. The combination of a plate, B, jaws A A', and screw F, connecting the said jaws, the whole being arranged and operating substantially as and for the purpose specified.

2. The combination of the said sliding jaws A and A', movable plate B, and lower permanent plate D, the whole being constructed and arranged for the lateral and longitudinal adjustment of the jaws, substantially as herein described.

In testimony whereof, I have signed my name to this specification in the presence of two subscribing witnesses.

ABIEZER JAMESON.

Witnesses:
JOHN WHITE,
W. J. R. DELANY.